(12) United States Patent
Walsh et al.

(10) Patent No.: US 10,880,300 B2
(45) Date of Patent: *Dec. 29, 2020

(54) SYSTEM AND METHOD FOR PROVIDING WEARABLE AUTHENTICATION AND MANAGEMENT

(71) Applicant: AT&T Mobility II LLC, Atlanta, GA (US)

(72) Inventors: Matthew Walsh, Roswell, GA (US); Christopher McConnell, Tahoe Vista, CA (US); Jeff Pedro, Alpharetta, GA (US); Matthew Mayheu, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 193 days.

This patent is subject to a terminal disclaimer.

(21) Appl. No.: 16/030,518

(22) Filed: Jul. 9, 2018

(65) Prior Publication Data
US 2018/0324178 A1 Nov. 8, 2018

Related U.S. Application Data

(63) Continuation of application No. 15/093,440, filed on Apr. 7, 2016, now Pat. No. 10,021,094.

(51) Int. Cl.
| | |
|---|---|
| *G06F 21/00* | (2013.01) |
| *H04W 12/08* | (2009.01) |
| *H04L 29/06* | (2006.01) |
| *G06F 21/62* | (2013.01) |

(52) U.S. Cl.
CPC ...... *H04L 63/0861* (2013.01); *H04L 63/0853* (2013.01); *H04L 63/101* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 8,869,263 B2 | 10/2014 | Pasquero et al. | |
| 8,892,036 B1 | 11/2014 | Causey et al. | |
| 8,994,498 B2 | 3/2015 | Agrafioti et al. | |
| 9,112,701 B2 | 8/2015 | Sano et al. | |
| 9,189,901 B2 | 11/2015 | Agrafioti et al. | |

(Continued)

*Primary Examiner* — Alexander Lagor
(74) *Attorney, Agent, or Firm* — Guntin & Gust, PLC; Jay H. Anderson

(57) ABSTRACT

A system for wearable authentication and management is disclosed. In particular, the system may include identifying and authenticating a user through biometric data or movement signatures specific to the wearer of a wearable device. Once the user and wearable device are authenticated, the system may activate and provision connectivity services for the wearable device, associate the device with a device ecosystem of the user, and push predefined settings to the wearable device. Additionally, the system may deliver communications that are transmitted to other devices in the device ecosystem to the wearable device while the wearable device is worn by the user. If the user no longer wears the wearable device or the wearable device is not utilized for a period of time, the system may deactivate the connectivity services for the wearable device and remove any settings pushed to the wearable device.

20 Claims, 3 Drawing Sheets

(56) References Cited

U.S. PATENT DOCUMENTS

| | | |
|---|---|---|
| 2004/0203605 A1 | 10/2004 | Safa |
| 2005/0079863 A1 | 4/2005 | Macaluso |
| 2006/0236388 A1 | 10/2006 | Ying et al. |
| 2009/0249460 A1 | 10/2009 | Fitzgerald et al. |
| 2009/0249478 A1 | 10/2009 | Rosener et al. |
| 2012/0317024 A1 | 12/2012 | Rahman et al. |
| 2014/0089672 A1 | 3/2014 | Luna et al. |
| 2014/0266597 A1 | 9/2014 | Narendra et al. |
| 2015/0035643 A1 | 2/2015 | Kursun |
| 2015/0163221 A1 | 6/2015 | Bolin et al. |
| 2015/0261946 A1 | 9/2015 | Yoon et al. |
| 2015/0286813 A1* | 10/2015 | Jakobsson ........... H04W 12/003 726/9 |
| 2015/0371024 A1 | 12/2015 | Kim et al. |
| 2016/0379205 A1* | 12/2016 | Margadoudakis ... G06Q 20/327 705/71 |
| 2017/0012959 A1* | 1/2017 | Sierra ................... H04L 63/083 |
| 2018/0288681 A1* | 10/2018 | Paredes Cabrera ... H04W 48/18 |

\* cited by examiner

SYSTEM AND METHOD FOR PROVIDING WEARABLE AUTHENTICATION AND MANAGEMENT

CROSS-REFERENCE TO RELATED APPLICATION

This application is a continuation of and claims priority to U.S. patent application Ser. No. 15/093,440, filed Apr. 7, 2016, which is hereby incorporated by reference in its entirety.

FIELD OF THE INVENTION

The present application relates to network security and authentication technologies, connectivity service sharing technologies, mobile device technologies, and wearable device technologies, and more particularly, to a system and method for providing wearable authentication and management.

BACKGROUND

In today's society, users are increasingly utilizing network and other service providers to gain access to the Internet, access software services, request and receive various types of content, access software applications, and perform a variety of other tasks and functions. Additionally, as technology has progressed, users are increasingly using not only smartphones to access content and services, but also a variety of other devices to access content and services. Such devices include, but are not limited to, laptops, tablets, phablets, computers, and a variety of wearable devices. The wearable device space is poised to expand dramatically in the coming years. For example, certain analysts are predicting multi-billion dollars in revenue for the wearable device space alone. Currently, many users view wearable devices, such as smart watches, as accessories to their smartphones instead of as replacements. However, as wearable devices start to gain further traction with users, such users will expect such wearable devices to have similar functionality and features as their smartphones. Additionally, much like the traditional watch and fashion jewelry space, it will be common for users to own multiple devices that serve similar functions. Furthermore, an increasing number of users are becoming familiar with the Internet of Things (IoT), which is the network of physical objects embedded with software, sensors, electronics, and network connectivity that enables such objects to exchange data between each other and with various systems.

While current technologies provide for many benefits and efficiencies, current technologies still have many shortcomings. In particular, current technologies often provide limited ways in which to authenticate users into various systems, device ecosystems, and networks. Additionally, current technologies often require users to subscribe to separate connectivity services for each device in their device ecosystem. For example, some users may purchase a wireless plan specifically for their smartphone, and may separately purchase a wireless plan specifically for their cellular-enabled tablet. As a result, this creates challenges for services providers with regard to both authentication and in the delivery of services. As a result, current methodologies and technologies associated with authenticating users and provisioning network and connectivity services may be modified so as to provide enhanced quality-of-service for users and companies. Such enhancements and improvements to methodologies and technologies may provide for improved customer satisfaction, increased security, increased ease-of-use, and substantial cost savings.

SUMMARY

A system and accompanying methods for providing wearable authentication and management are disclosed. In particular, the system and methods may allow for the identification and authentication of users through the use of biometric data, movement signatures, and/or other authentication information specific to a user of a user device, such as a wearable device. Based on the authentication, the system and methods may deliver a number of different capabilities, experiences, and services to the user and/or the user device. In order to accomplish the foregoing, the system and methods may involve receiving biometric data, a movement signature, and/or other authentication information from a wearable device worn by a user. The system and methods may analyze the biometric data, movement signature, and/or authentication information to determine if they match biometric data, a movement signature and/or authentication information associated with a plan for connectivity services. If the biometric data, movement signature, and/or authentication information do not match the biometric data, the movement signature, and/or the authentication information associated with the plan, the system and methods may prevent the wearable device and the user from being provisioned with or utilizing the connectivity services associated with the plan.

If, however, the received biometric data, movement signature, and/or authentication information do match the biometric data, the movement signature, and/or the authentication information associated with the plan, the system and methods may include authenticating the user and the wearable device worn by the user. Once the user and wearable device are authenticated, the system and methods may include activating and provisioning wireless connectivity for the wearable device and associating the device with the various services under the plan. In certain embodiments, the wearable device may be joined to a device ecosystem formed by the devices already serviced under the plan. The system and methods may also include delivering predefined settings tailored to the wearable device, and delivering communications that are sent to other devices in the device ecosystem also to the wearable device. In certain embodiments, the system and methods may provide for additional levels of authentication so as to allow the wearable device to securely access the user's connected home, bank accounts, office buildings, hotels, vehicles, devices, and/or programs. In certain embodiments, the system and methods may allow the wearable device to be automatically granted access to participate in high-security transactions based on the authentication.

If the user ceases to wear the wearable device or does not utilize the wearable device for a threshold period of time, the system and methods may include deactivating the connectivity services that were provisioned for the wearable device. Additionally, the system and methods may include removing the predefined settings pushed to the wearable device after authentication. Furthermore, the system and methods may also include removing any data and content provided to the wearable device while the wearable device was being worn by the user. In certain embodiments, the system and methods may include providing notifications of unauthorized usage if the wearable device is not authenticated or the wearable device is stolen. In such embodiments, the system and methods may include tracking and monitoring the wearable device. In additional embodiments, the system and methods may include transmitting notifications to the user associated with the plan if the wearable device (or other device) has not been utilized for a selected period of time. In such a scenario, the system and methods may enable the user to terminate any services being provided to the wearable device (or other device).

Notably, the system and methods may enable users to have multiple devices without having to maintain an individual connection for each device in the users' device ecosystems. Additionally, in certain embodiments, the system and methods may more efficiently utilize network resources by only creating a connection for a device while it is being worn. The system and methods may provide for a seamless experience allowing for connectivity to connected wearable devices without the need to provision or establish a connection for each use. The systems and methods also allow for highly secure authentication allowing users to protect what is important to them, and also ensure proper access by an enterprise. Furthermore, the system and methods allow users to better manage the number of active devices on their plan and quickly understand which devices have been inactive for a given period of time. As a result of the foregoing, the system and methods allow for greater conservation of network resources, improved user satisfaction, increased authentication and security, increased ease-of-use, and substantial cost savings.

In one embodiment, a system for providing wearable authentication and management is disclosed. The system may include a memory that stores instructions and a processor that executes the instructions to perform various operations of the system. The system may perform an operation that includes receiving first biometric data and/or a first movement signature from a first wearable device worn by a first user. Based on the first biometric data and/or first movement signature received from the first wearable device worn by the first user, the system may perform an operation that includes determining if the first biometric data matches second biometric data associated with a plan for connectivity services provided by a service provider and/or determining if the first movement signature matches a second movement signature associated with the plan. If the first biometric data matches the second biometric data and/or if the first movement signature matches the second movement signature, the system may perform an operation that includes authenticating the first user and the first wearable device worn by the first user for access to the connectivity services. After authenticating the first user and the first wearable device, the system may perform an operation that includes provisioning the connectivity services for the first wearable device. The system may then proceed to perform an operation that includes delivering, to the first wearable device, predefined settings established for the first wearable device in the plan for the connectivity services. Finally, the system may proceed to perform an operation that includes delivering, to the first wearable device, a communication sent to a primary device of the first user.

In another embodiment, a method for providing wearable authentication and management is disclosed. The method may include utilizing a memory that stores instructions, and a processor that executes the instructions to perform the various functions of the method. In particular, the method may include receiving first biometric data and/or a first movement signature from a first wearable device worn by a first user. Additionally, the method may include determining, based on the first biometric data received from the first wearable device worn by the first user, if the first biometric data matches second biometric data associated with a plan for connectivity services provided by a service provider. The method may also include determining, based on the first movement signature received from the first wearable device, if the first movement signature matches a second movement signature associated with the plan. If the first biometric data matches the second biometric data and/or if the first movement signature matches the second movement signature, the method may include authenticating the first user and the first wearable device worn by the first user for access to the connectivity services. After authenticating the first user and the first wearable device, the method may include provisioning the connectivity services for the first wearable device. The method may then include delivering, to the first wearable device, predefined settings established for the first wearable device in the plan for the connectivity services. Finally, the method may include delivering, to the first wearable device, a communication sent to a primary device of the first user.

According to yet another embodiment, a computer-readable device having instructions for providing wearable authentication and management is provided. The computer instructions, which when loaded and executed by a processor, may cause the processor to perform operations including: receiving first biometric data from a first wearable device worn by a first user; determining, based on the first biometric data received from the first wearable device worn by the first user, if the first biometric data matches second biometric data associated with a plan for connectivity services provided by a service provider; authenticating, if the first biometric data matches the second biometric data, the first user and the first wearable device worn by the first user for access to the connectivity services; provisioning, after authenticating the first user and the first wearable device, the connectivity services for the first wearable device; delivering, to the first wearable device, predefined settings established for the first wearable device in the plan for the connectivity services; and delivering, to the first wearable device, a communication sent to a primary device of the first user.

These and other features of the systems and methods for providing wearable authentication and management are described in the following detailed description, drawings, and appended claims.

DETAILED DESCRIPTION OF THE INVENTION

Figure 1:
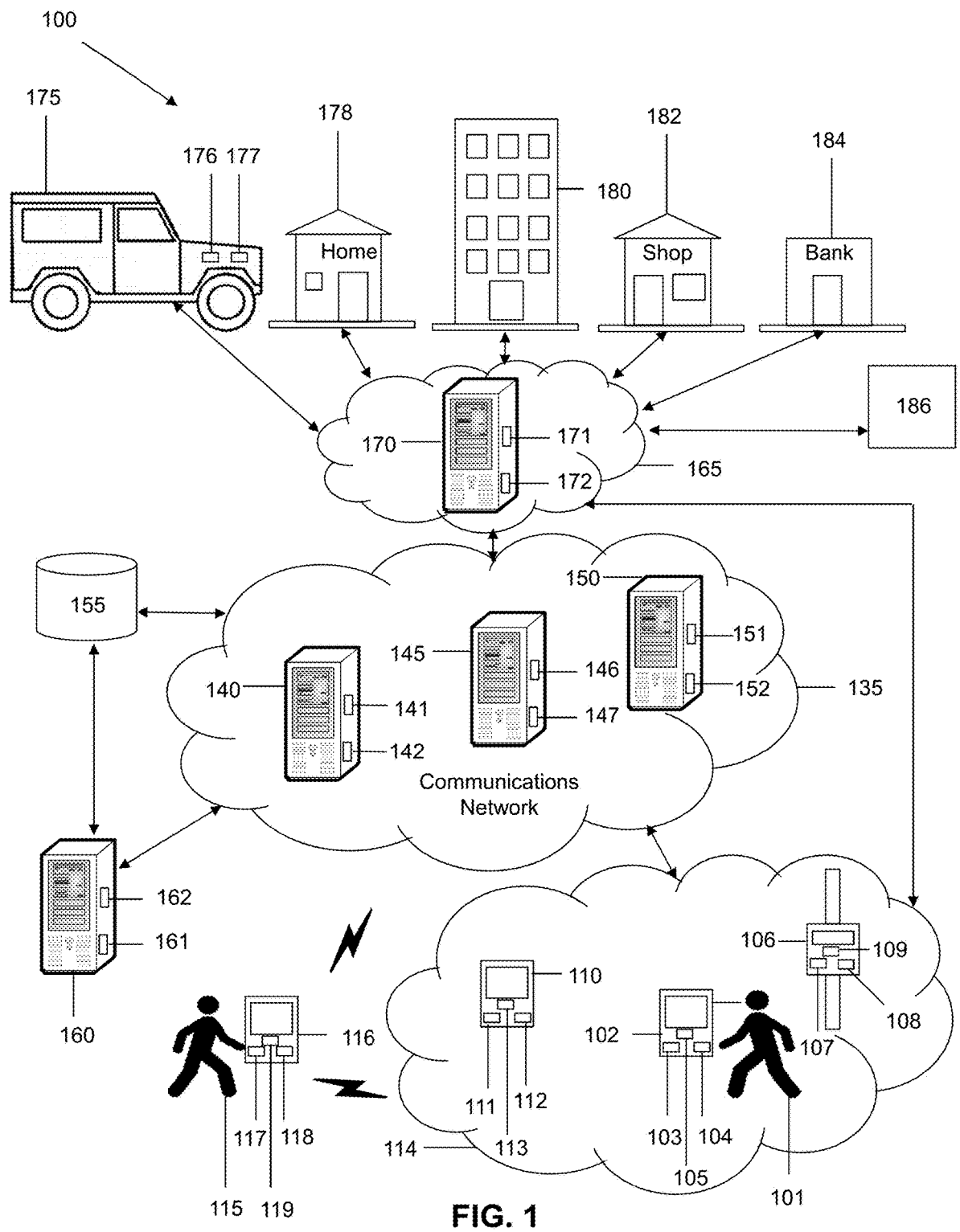
FIG. 1 is a schematic diagram of a system for providing wearable authentication and management according to an embodiment of the present disclosure.

A system 100 and accompanying methods for providing wearable authentication and management are disclosed. In particular, the system 100 and methods may allow for the identification and authentication of users (e.g. first and second users 101, 115) through the use of biometric data, movement signatures, and/or other authentication information specific to a user of a user device, such as a wearable device (e.g. first, second, third, and/or fourth user devices 102, 106, 110, 116). Based on the authentication, the system 100 and methods may deliver a number of different capabilities, experiences, and services to the user and/or the user device. In order to accomplish the foregoing, the system 100 and methods may involve receiving biometric data, a movement signature, and/or other authentication information from a wearable device worn by a user. The system 100 and methods may include analyzing the biometric data, movement signature, and/or authentication information to determine if they match biometric data, a movement signature and/or authentication information associated with a plan for connectivity services. If the biometric data, movement signature, and/or authentication information do not match the biometric data, the movement signature, and/or the authentication information associated with the plan, the system 100 and methods may prevent the wearable device from being authenticated and from being provisioned with the connectivity services associated with the plan.

If, however, the received biometric data, movement signature, and/or authentication information do match the biometric data, the movement signature, and/or the authentication information associated with the plan, the system 100 and methods may include authenticating the user and the wearable device worn by the user. Once the user and wearable device are authenticated, the system 100 and methods may include activating and provisioning wireless connectivity for the wearable device and associating the device with the various services under the plan. In certain embodiments, the wearable device may be joined to a device ecosystem 114 formed by the devices already serviced under the plan. The system 100 and methods may also include delivering predefined settings tailored to the wearable device, and delivering communications that are sent to other devices in the device ecosystem 114 also to the wearable device. In certain embodiments, the system 100 and methods may provide for additional levels of authentication so as to allow the wearable device to securely access the user's connected home, bank accounts, office buildings, hotels, vehicles, devices, and/or programs. In certain embodiments, the system 100 and methods may allow the wearable device to be automatically granted access to participate in high-security transactions based on the authentication.

If the user ceases to wear the wearable device or does not utilize the wearable device for a threshold period of time, the system 100 and methods may include deactivating the connectivity services that were provisioned for the wearable device. Additionally, the system 100 and methods may include removing the predefined settings pushed to the wearable device after authentication. Furthermore, the system 100 and methods may also include removing any data and content provided to the wearable device while the wearable device was being worn by the user. In certain embodiments, the system 100 and methods may include providing notifications of unauthorized usage if the wearable device is not authenticated or the wearable device is stolen or otherwise compromised. In such embodiments, the system 100 and methods may include tracking and monitoring the wearable device. In additional embodiments, the system 100 and methods may include transmitting notifications to the user associated with the plan if the wearable device (or other device) has not been utilized for a selected period of time. In such a scenario, the system 100 and methods may enable the user to terminate any services being provided to the wearable device (or other device).

Notably, the system 100 and methods may enable users to have multiple devices without having to maintain an individual connection for each device in the users' device ecosystems. Additionally, in certain embodiments, the system 100 and methods may more efficiently utilize network resources by only creating a connection for a device while it is being worn. The system 100 and methods may provide for a seamless experience allowing for connectivity to connected wearable devices without the need to provision or establish a connection for each use. The system 100 and methods also allow for highly secure authentication allowing users to protect what is important to them, and also ensure proper access by an enterprise. Furthermore, the system 100 and methods allow users to better manage the number of active devices on their plan and quickly understand which devices have been inactive for a given period of time. As a result, the system 100 and methods allow for greater conservation of network resources, improved user satisfaction, increased authentication and security, increased ease-of-use, and substantial cost savings.

As shown in FIG. 1, a system 100 for providing wearable authentication and management is disclosed. The system 100 may be configured to support, but is not limited to supporting, content delivery services, cloud computing services, authentication services, IoT services, IP Multimedia Subsystem (IMS) services, satellite services, telephone services, voice-over-internet protocol services (VoIP), voice-over-long-term-evolution (VoLTE) services, software as a service (SaaS) applications, gaming applications and services, social media applications and services, operations management applications and services, productivity applications and services, mobile applications and services, connected vehicle applications and services, connected home applications and services, and any other computing applications and services. The system may include a first user 101, who may utilize a first user device 102 to access data, content, and services, or to perform a variety of other tasks and functions. As an example, the first user 101 may utilize first user device 102 to transmit signals to access various online services and content, such as those provided by a content provider or service provider associated with communications network 135. In certain embodiments, the first user 101 may be a subscriber of a service provider that controls communications network 135.

The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface that may enable the first user 101 to interact with various applications executing on the first user device 102 and to interact with the system 100. Furthermore, the first user device 102 may include one or more sensors and may include an accelerometer 105, which may be configured to measure a rate of acceleration associated with movements made by the first user 101 and/or the first user device 102. In certain embodiments, accelerometer 105 may be utilized to obtain acceleration and movement measurements that may be utilized to determine the first user's 101 movement signature. The movement signature may indicate a walking pattern, a gait pattern, a movement pattern, or a combination thereof of the first user 101. The first user device 102 may also include gyroscopes (i.e. to measure orientation), global positioning system (GPS)

devices (i.e. to determine location), motion sensors, temperature sensors, proximity sensors (i.e. to determine proximity to other devices in the system 100, to a particular location, and/or to the first user 101), light sensors, acoustic sensors, tilt sensors, and/or other sensors as well. In certain embodiments, the first user device 102 may be a wearable device, a computer, a laptop, a set-top-box, a tablet device, a phablet, a server, a mobile device, a smartphone, a smart watch, and/or any other type of computing device. Illustratively, the first user device 102 is shown as a smartphone device in FIG. 1.

In addition to using first user device 102, the first user 101 may also utilize a second user device 106 and a third user device 110. As with first user device 102, the first user 101 may utilize the second and third user devices 106, 110 to transmit signals to access various online services and content, such as those provided by a content provider or service provider associated with communications network 135. The second user device 106 may include a memory 107 that includes instructions, and a processor 108 that executes the instructions from the memory 107 to perform the various operations that are performed by the second user device 106. In certain embodiments, the processor 108 may be hardware, software, or a combination thereof. The second user device 106 may also include an interface that may enable the first user 101 to interact with various applications executing on the second user device 106 and to interact with the system 100. Furthermore, the second user device 106 may include one or more sensors and may include an accelerometer 109, which may be configured to measure a rate of acceleration associated with movements made by the first user 101 and/or the second user device 106. In certain embodiments, accelerometer 109 may be utilized to obtain acceleration and movement measurements that may be utilized to determine the first user's 101 movement signature. The second user device 106 may also include gyroscopes (i.e. to measure orientation), GPS devices (i.e. to determine location), motion sensors, temperature sensors, proximity sensors (i.e. to determine proximity to other devices in the system 100, to a particular location, and/or to the first user 101), light sensors, acoustic sensors, tilt sensors, and/or other sensors as well. In certain embodiments, the second user device 106 may be a wearable device, a computer, a laptop, a set-top-box, a tablet device, a phablet, a server, a mobile device, a smartphone, a smart watch, and/or any other type of computing device. Illustratively, the second user device 106 is shown as a smart watch device in FIG. 1.

The third user device 110 may include a memory 111 that includes instructions, and a processor 112 that executes the instructions from the memory 111 to perform the various operations that are performed by the third user device 110. In certain embodiments, the processor 112 may be hardware, software, or a combination thereof. The third user device 110 may also include an interface that may enable the first user 101 to interact with various applications executing on the third user device 110 and to interact with the system 100. Furthermore, the third user device 110 may include one or more sensors and may include an accelerometer 113, which may be configured to measure a rate of acceleration associated with movements made by the first user 101 and/or the third user device 110. In certain embodiments, accelerometer 113 may be utilized to obtain acceleration and movement measurements that may be utilized to determine the first user's 101 movement signature. The third user device 110 may also include gyroscopes (i.e. to measure orientation), GPS devices (i.e. to determine location), motion sensors, temperature sensors, proximity sensors (i.e. to determine proximity to other devices in the system 100, to a particular location, and/or to the first user 101), light sensors, acoustic sensors, tilt sensors, and/or other sensors as well. In certain embodiments, the third user device 110 may be a wearable device, a computer, a laptop, a set-top-box, a tablet device, a phablet, a server, a mobile device, a smartphone, a smart watch, and/or any other type of computing device. Illustratively, the third user device 110 is shown as a tablet device in FIG. 1.

The first, second, and third user devices 102, 106, 110 may belong to and/or form a device ecosystem 114. In certain embodiments, the device ecosystem 114 may be a unique network that enables the devices within the device ecosystem 114 to share communications, exchange data and content, and be communicatively linked. In certain embodiments, the device ecosystem 114 may be formed between the first, second, and third user devices 102, 106, 110 through the use of any type of wireless protocol and/or technology, such as IoT technologies. Devices in the device ecosystem 114 may be authenticated with each other and may enable the devices within the device ecosystem 114 to share connectivity services, such as, but not limited to, internet connections and services, cellular connections and services, and/or other types of connections and services. For example, the first, second, and third user devices 102, 106, 110 may communicate with one another in the device ecosystem 114 by utilizing IoT technologies, Bluetooth Low Energy (BLE), classic Bluetooth, ZigBee, cellular, near-field communications (NFC), Wi-Fi, Z-Wave, ANT+, IEEE 802.15.4, IEEE 802.22, ISA100a, infrared (IrDA), ISM band, radio frequency identification (RFID), UWB, Wireless HD, Wireless USB, any other protocol and/or wireless technology, or any combination thereof.

As indicated above, the first, second, and third user devices 102, 106, 110 within the device ecosystem 114 may share and exchange data with each other via the device ecosystem 114. For example, the first, second, and third user devices 102, 106, 110 may share information relating to the various components of the first, second, and third user devices 102, 106, 110, information identifying the first, second, and third user devices' 102, 106, 110 locations, information identifying the first, second, and third user devices' 102, 106, 110 power levels, information identifying the types of connections utilized by the first, second, and third user devices 102, 106, 110, information identifying the applications being utilized on the first, second, and third user devices 102, 106, 110, information identifying how the first, second, and third user devices 102, 106, 110 are being utilized by the first user 101, information identifying whether the first, second, and third user devices 102, 106, 110 are moving and in what direction, information identifying an orientation of the first, second, and third user devices 102, 106, 110, information identifying whether the first, second, and third user devices 102, 106, 110 have been stolen, information identifying which user (e.g. first user 101, second user 115, or both) is logged into the first, second, and third user devices 102, 106, 110, information identifying user profiles for users of the first, second, and third user devices 102, 106, 110, information identifying device profiles for the first, second, and third user devices 102, 106, 110, information identifying the number of devices in the device ecosystem 114, information identifying devices being added to or removed from the device ecosystem 114, any information obtained from any sensor of the first, second, and third user devices 102, 106, 110, any other information, or any combination thereof.

Information obtained from the sensors of the first, second, and third user devices 102, 106, 110 may include, but is not limited to, temperature measurements from temperature sensors of the first, second, and third user devices 102, 106, 110, light measurements from light sensors of the first, second, and third user devices 102, 106, 110, sound measurements from acoustic sensors of the first, second, and third user devices 102, 106, 110, vibration measurements from vibration sensors of the first, second, and third user devices 102, 106, 110, global positioning information from GPS devices of the first, second, and third user devices 102, 106, 110, proximity information from proximity sensors of the first, second, and third user devices 102, 106, 110, motion information from motion sensors of the first, second, and third user devices 102, 106, 110, presence information from presence sensors of the first, second, and third user devices 102, 106, 110, heart rate information from heart rate sensors of the first, second, and third user devices 102, 106, 110, orientation information from gyroscopes of the first, second, and third user devices 102, 106, 110, tilt information from tilt sensors of the first, second, and third user devices 102, 106, 110, acceleration information from accelerometers of the first, second, and third user devices 102, 106, 110, information from any other sensors, or any combination thereof. In certain embodiments, information from the sensors of the first, second, and third user devices 102, 106, 110 may be transmitted via one or more signals to each other and to the components of the system 100.

In addition to the first user 101, the system 100 may also include a second user 115, who may utilize a fourth user device 116 to perform a variety of functions. For example, the fourth user device 116 may be utilized by the second user 115 to transmit signals to request various types of content, services, and data provided by content and service providers associated with the communications network 135 or any other network in the system 100. The fourth user device 116 may include a memory 117 that includes instructions, and a processor 118 that executes the instructions from the memory 117 to perform the various operations that are performed by the fourth user device 116. In certain embodiments, the processor 118 may be hardware, software, or a combination thereof. The fourth user device 116 may also include an interface that may enable the second user 115 to interact with various applications executing on the fourth user device 116 and to interact with the system 100. Furthermore, the fourth user device 116 may include one or more sensors and may include an accelerometer 119, which may be configured to measure a rate of acceleration associated with movements made by the second user 115 and/or the fourth user device 116. In certain embodiments, accelerometer 119 may be utilized to obtain acceleration and movement measurements that may be utilized to determine the second user's 115 movement signature. The fourth user device 116 may also include gyroscopes (i.e. to measure orientation), GPS devices (i.e. to determine location), motion sensors, temperature sensors, proximity sensors (i.e. to determine proximity to other devices in the system 100, to a particular location, and/or to the second user 115), light sensors, acoustic sensors, tilt sensors, and/or other sensors as well In certain embodiments, the fourth user device 116 may be a wearable device, a computer, a laptop, a set-top-box, a tablet device, a phablet, a server, a mobile device, a smartphone, a smart watch, and/or any other type of computing device. Illustratively, the fourth user device 116 is shown as a smartphone device in FIG. 1.

In certain embodiments, the first user device 102, the second user device 106, the third user device 110, and/or the fourth user device 116 may have any number of software applications and/or application services stored and/or accessible thereon. For example, the first, second, third, and fourth user devices 102, 106, 110, 116 may include cloud-based applications, VoIP applications, phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 115 to readily interact with the software applications. The software applications and services may also be utilized by the first and second users 101, 115 to interact with any device in the system 100, any network in the system 100, or any combination thereof. In certain embodiments, the first, second, third, and fourth user devices 102, 106, 110, 116 may include associated telephone numbers, device identities, or any other identifiers to uniquely identify the first, second, third, and fourth user devices 102, 106, 110, 116.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The server 140 may serve as a network provisioning server that may be configured to provision various types of connectivity services to any device in the system 100. The server 145 may be a profile server that may be configured to store, transmit, and/or receive the user profiles as described herein. The server 150 may be a platform server that may be configured to forward communications and calls intended for a certain device to other devices that are authenticated to the device ecosystem 114 that the certain device is a member of. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, the device ecosystem 114, the communications network 165, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, the device ecosystem 114, the communications network 165, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operation associated with the database 155. In certain embodiments, the database 155 may be connected to the servers 140, 145, 150, 160, 170, the first user device 102, the second user device 106, the third user device 110, the fourth user device 116, the vehicle 175, the home 178, the hotel 180, the shop 182, the bank 184, the entity 186, any devices in the system 100, any other device, any network, or any combination thereof.

The database 155 may also store information and metadata obtained from the system 100; store metadata and other information associated with the first and second users 101, 115; store user profiles associated with the first and second users 101, 115; store device profiles associated with any device in the system 100; store communications traversing the system 100; store user preferences; store information associated with any device or signal in the system 100; store information relating to patterns of usage relating to the first, second, third, and fourth user devices 102, 106, 110, 116; store any information obtained from any of the networks in the system 100; store historical data associated with the first and second users 101, 115; store device characteristics for any of the devices in the system 100; store information relating to any devices associated with the first and second users 101, 115; store any information associated with the vehicle 175, the home 178, the hotel 180, the shop 182, the bank 184, and/or the entity 186; store biometric information associated with the first and second users 101, 115; store movement signatures for the first and second users 101, 115; store passwords, log on sequences, and/or authentication information for the first and second users 101, 115 and/or any of the devices in the system 100; store information associated with the device ecosystem 114; store tracking information indicating the location of the first, second, third, and fourth user devices 102, 106, 110, 116; store time thresholds that trigger the deactivation of connectivity services for the first, second, third, and fourth user devices 102, 106, 110, 116; store lists identifying the devices authorized or unauthorized to be included within device ecosystems 114; store predefined settings to be pushed to the first, second, third, and/or fourth user devices 102, 106, 110, 116 based on the capabilities of each of the devices and/or preferences of the first and second users 101, 115; store any information generated and/or processed by the system 100; store any of the information disclosed for any of the operations and functions disclosed for the system 100 herewith; store any information traversing the system 100, or any combination thereof. Furthermore, the database 155 may be configured to process queries sent to it by any device in the system 100.

The system 100 may also include a communications network 165. The communications network 165 of the system 100 may be configured to link each of the devices in the system 100 to one another and to the communications network 135. Additionally, the communications network 165 may be configured to transmit, generate, and receive any information and data traversing the system 100. In certain embodiments, the communications network 165 may include any number of servers, databases, or other componentry, and may be controlled by a service provider. The communications network 165 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network, or any combination thereof. Illustratively, server 170 is shown as being included within communications network 165. In certain embodiments, the communications network 165 may be part of a single autonomous system that is located in a particular geographic region, or be part of multiple autonomous systems that span several geographic regions.

Notably, the functionality of the communications network 165 and the system 100 may be supported and executed by utilizing the server 170. The server 170 may reside in communications network 165, however, in certain embodiments, the server 170 may reside outside communications network 165. The server 165 may serve as an authentication server that may be configured to analyze biometric data, movement signatures, passwords, log on sequences, or other authentication information to determine if a particular device and/or user is authorized to be a part of the device ecosystem 114, is authorized to be provisioned with certain types of connectivity services, and/or is authorized for transactions and/or communications with third parties (e.g. with the vehicle 175, the home 178, the hotel 180, the shop 182, the bank 184, and/or the entity 186). In certain embodiments, the server 170 may include a memory 171 that includes instructions, and a processor 172 that executes the instructions from the memory 171 to perform various operations that are performed by the server 170. The processor 172 may be hardware, software, or a combination thereof. In certain embodiments, the server 170 may be a network server, a router, a gateway, a switch, a media distribution hub, a signal transfer point, a service control point, s service switching point, a firewall, an edge device, a node, a computer, a mobile device, or any other suitable computing device, or any combination thereof. In certain embodiments, the server 170 may be communicatively linked to the communications network 135, the device ecosystem 114, the communications network 165, any network, any device in the system 100, or any combination thereof.

In certain embodiments, the system 100 may include a vehicle 175, which may be any type of mobile connected device, such as an unmanned mobile connected vehicle (e.g. autonomous vehicle), a passenger vehicle, any other type of vehicle, or any combination thereof. In certain embodiments, the system 100 may include any number of vehicles 175, and the vehicle 175 may be a car, a truck, a train, a plane, a boat, a ship, a trolley, a motorcycle, a bike, any type of vehicle, any type of moving device, or any combination thereof. The vehicle 175 may include a memory 176 that includes instructions, and a processor 177 that executes the instructions from the memory 176 to perform the various operations that are performed by the vehicle 175. In certain embodiments, the processor 177 may be hardware, software, or a combination thereof. The various systems, features, and functionality of the vehicle 125 may be controlled by the system 100 and/or the communications network 135. In certain embodiments, the vehicle 175 may be configured to join the device ecosystem 114, share communications with the devices in the device ecosystem 114, share connectivity services with the devices in the device ecosystem 114, share settings with the devices in the device ecosystem 114, or any combination thereof. In certain embodiments, if a device is authenticated to be a part of the device ecosystem 114, the device may be granted automatic access to the features and functionality of the vehicle 175. In certain embodiments, an authenticated device may be authorized to have automatic authorization to participate in communications and certain classes of transactions (e.g. e-commerce transactions) with the vehicle 175.

In certain embodiments, the system 100 may also include a connected home 178, which may be configured to include smart locks, smart media centers, smart thermostats, and IoT devices that may be utilized to provide the various features and functionality of the connected home 178. In certain embodiments, the connected home 178 may be configured to join the device ecosystem 114, share communications with the devices in the device ecosystem 114, share connectivity services with the devices in the device ecosystem 114, share settings with the devices in the device ecosystem 114, or any combination thereof. In certain embodiments, if a device is authenticated to be a part of the device ecosystem 114, the device may be granted automatic access to the features and functionality of the connected home 178. In certain embodiments, an authenticated device may be authorized to have automatic authorization to participate in communications and certain classes of transactions (e.g. e-commerce transactions or other transactions) with the connected home 178. In certain embodiments, an authenticated device may be granted automatic access to any of the devices in the connected home 178. For example, an authenticated device may unlock a lock of the connected home 178, activate or deactivate the media center of the connected home 178, activate, adjust, or deactivate a smart thermostat of the connected home 178, or any combination thereof.

In certain embodiments, the system 100 may include a connected hotel 180, which may be configured to include various devices, such as IoT devices, that may be utilized to provide the various features and functionality of the connected hotel 180. In certain embodiments, the connected hotel 180 may be configured to join the device ecosystem 114, share communications with the devices in the device ecosystem 114, share connectivity services with the devices in the device ecosystem 114, share settings with the devices in the device ecosystem 114, or any combination thereof. In certain embodiments, if a device is authenticated to be a part of the device ecosystem 114, the device may be granted automatic access to the features and functionality of the connected hotel 180. In certain embodiments, an authenticated device may be authorized to have automatic authorization to participate in communications and certain classes of transactions (e.g. e-commerce transactions for setting a reservation or purchasing services or products) with the connected hotel 180. In certain embodiments, an authenticated device may be granted automatic access to any of the devices in the connected hotel 180. For example, an authenticated device may be configured to unlock a hotel room that was reserved by the first user 101.

The system 100 may include a connected shop 182, which may be configured to include various devices, such as IoT devices, that may be utilized to provide the various features and functionality of the connected shop 182. In certain embodiments, the connected shop 182 may be configured to join the device ecosystem 114, share communications with the devices in the device ecosystem 114, share connectivity services with the devices in the device ecosystem 114, share settings with the devices in the device ecosystem 114, or any combination thereof. In certain embodiments, if a device is authenticated to be a part of the device ecosystem 114, the device may be granted automatic access to the features and functionality of the connected shop 182. In certain embodiments, an authenticated device may be authorized to have automatic authorization to participate in communications and certain classes of transactions (e.g. transactions for purchasing products) with the connected shop 182. In certain embodiments, an authenticated device may be granted automatic access to any of the devices in the connected shop 182. For example, an authenticated device may be configured to automatically pair with a beacon of the connected shop 182 that may be configured to transmit product details and information to the authenticated device.

In certain embodiments, the system 100 may include a connected bank 184, which may be configured to include various devices, such as IoT devices, that may be utilized to provide the various features and functionality of the connected bank 184. In certain embodiments, the connected bank 184 may be configured to join the device ecosystem 114, share communications with the devices in the device ecosystem 114, share connectivity services with the devices in the device ecosystem 114, share settings with the devices in the device ecosystem 114, or any combination thereof. In certain embodiments, if a device is authenticated to be a part of the device ecosystem 114, the device may be granted automatic access to the features and functionality of the connected bank 184. In certain embodiments, an authenticated device may be authorized to have automatic authorization to participate in communications and certain classes of transactions (e.g. transactions for establishing bank accounts, purchasing investments, withdrawing or depositing funds, etc.) with the connected bank 184. In certain embodiments, an authenticated device may be granted automatic access to any of the devices in the connected bank 184. For example, an authenticated device may be configured to automatically unlock a safety deposit box at the bank 184.

In certain embodiments, the system 100 may include an entity 186, which may be a web-based entity, a device, a software program, a software process, or any combination thereof. In certain embodiments, the entity 186 may be configured to join the device ecosystem 114, share communications with the devices in the device ecosystem 114, share connectivity services with the devices in the device ecosystem 114, share settings with the devices in the device ecosystem 114, or any combination thereof. In certain embodiments, if a device is authenticated to be a part of the device ecosystem 114, the device may be granted automatic access to the features and functionality of the entity 186. In certain embodiments, an authenticated device may be authorized to have automatic authorization to participate in communications and certain classes of transactions (e.g. e-commerce transactions, calls, text messages, log-in processes) with the entity 186. For example, if entity 186 is a gaming website, an authenticated device may be automatically log into a game supported by the gaming website.

Operatively, the system 100 may provide for wearable authentication and management, as shown in the following exemplary scenario. In this example scenario, there may be a first user 101 that may have a smartphone (i.e. first user device 102), a smart watch (i.e. second user device 106), and a tablet (i.e. third user device 110). There may also be a second user 115 that may have a wearable smartphone (i.e. fourth user device 116). The first user 101 may subscribe to a wireless connectivity plan with a service provider associated with communications network 135 and/or communications network 165. The first user 101 may enroll the smartphone, the smart watch, and the tablet into the wireless connectivity plan. The smartphone and the tablet may initially belong to a device ecosystem 114, which may allow each of the devices in the device ecosystem to share information, content, data, and communications with each other. Additionally, the first user 101 may authorize one or more other users who may borrow the first user's 101 devices and/or utilize their own devices under the plan. The authorized users may be specified in a list of authorized users, which may be stored in a user profile of the first user 101. The first user 101 may authorize the second user 115 to utilize connectivity services subscribed to by the first user 101 under the plan.

In addition to specifying authorized users, the first user 101 may establish desired settings to be pushed to each device that is authorized by the system 100, such as to a device authorized to join the device ecosystem 114. The settings may indicate the amount of bandwidth associated with the connectivity services that a device should be authorized to receive and/or use, whether certain notifications should be turned off or on for a particular device, whether a certain device should be authorized to make calls, whether a certain device may send or receive text messages and/or instant messages, whether a certain device may make roaming calls, whether a certain device can access a certain type of application, whether a certain device may access the vehicle 175, whether a certain device may access a connected home 178, whether a device may access an account associated with hotel 180, whether a certain device may make e-commerce transactions with shop 182, whether a certain device may access a bank account associated with bank 184, whether a certain device may access an account associated with entity 186, whether there is automatic authorization to participate in certain classes of transactions with third parties, any other possible setting, or any combination thereof. In certain embodiments, the settings may be adjusted based on the capabilities and technical specifications of the device.

The first user 101 may put on the smart watch, which may prompt the first user 101 for authentication information to access the connectivity services under the plan, such as via an application of the smart watch. Authentication information may be a biometric input that may be received via the smart watch of the first user 101. The biometric input, for example, may include a heart rate, a fingerprint, an iris scan, any other biometric input, or any combination thereof. For example, the smart watch may have a fingerprint scanner or a heart rate sensor to obtain the biometric input from the first user 101. Additionally, another type of authentication input may be a movement signature. An accelerometer 109 of the smart watch may also measure the movements of the first user 101, which may be utilized to generate a movement signature of the first user 101. The movement signature, for example, may be a walking style, gait, or other movement that is unique to the first user 101. Furthermore, the smart watch may also be configured to receive other authentication information, such as a one-time password, which may be input via an application executing on the smart watch. Whether a biometric input, movement signature input, or other authentication input is needed may be determined based on what is specified by the system 100, in the plan, and/or in a user profile of the first user 101. In certain embodiments, the system 100 may require one of a biometric input, a movement signature, or a password. In certain embodiments, the system 100 may require certain combinations of the aforementioned inputs to gain access to the connectivity services under the plan.

Once the biometric input, movement signature, and/or other authentication information are received from the smart watch, the smart watch may deliver the inputs to the server 170, which may be an authentication server of communications network 165. The server 170 may analyze the biometric input, movement signature, and/or other authentication information received from the smart watch to determine if they match stored biometric input, movement signature, and/or other authentication information contained in a user profile associated with the plan. If the inputs do not match the stored authentication information, the system 100 may block the wearable device from joining the device ecosystem 114, from being provisioned with connectivity services under the plan, or a combination thereof. However, if the inputs do match the stored authentication information, the server 170 may authenticate the first user 101 and the smart watch. In certain embodiments, once the first user 101 and the smart watch are authenticated, wireless connectivity may be activated for the smart watch and the smart watch may be provisioned with connectivity services under the plan, such as by utilizing the servers in communications network 135. Also, the smart watch may be joined to the device ecosystem 114 with the smartphone and tablet. Additionally, any predefined settings specified for the smart watch may be pushed to the smart watch by the servers in the communications network 135. For example, the settings may obtained from a user profile of the first user 101 that specifies the settings, and then the settings may be pushed to the smart watch. The settings pushed to the smart watch may cause the smart watch to operate under the conditions of the settings.

Once the smart watch is authenticated, the connectivity services are activated for the smart watch, and the settings are pushed to the smart watch, the system 100 may allow one or more communications to be delivered to the smart watch. For example, an incoming call to the smartphone may be forwarded to the smart watch for the first user 101 to answer. Similarly, a text message, email, instant message, or other communication sent to the tablet or smartphone may also be sent to the smart watch. Each of the devices in the device ecosystem 114 may share communications with each other while each of the devices and/or the first user 101 are authenticated. Additionally, based on the authentication, the smart watch may be pre-authorized to access features and functionality of the vehicle 175, the connected home 178, the hotel 180, the shop 182, the bank 184, and/or the entity 186. Furthermore, the smart watch may also be pre-authorized to conduct certain types of transactions with third parties, such as, but not limited to, the vehicle 175, the connected home 178, the hotel 180, the shop 182, the bank 184, and/or the entity 186 based on the authentication. For example, the smart watch may be pre-authorized to conduct an e-commerce transaction with the shop 182.

If, however, the first user 101 stops wearing the smart watch and/or does not utilize the smart watch for a threshold period of time specified under the plan, the system 100 may deactivate the wireless connectivity services to the smart watch and delete any settings pushed to the smart watch. Additionally, any content and data obtained by the smart watch while the smart watch was authenticated may be optionally deleted or removed as well. Furthermore, any authorization to conduct transactions with third parties may also be removed. In certain embodiments, when the first user 101 stops wearing the smart watch and/or does not utilize the smart watch for the threshold period of time, the system 100 may relegate the smart watch to the communications network 165 until the smart watch is authenticated again. In such a scenario, the communications network 165 may serve as a walled garden that may block the smart watch from accessing the device ecosystem 114, the connectivity services under the plan, from receiving communications associated with the devices in the device ecosystem 114, or a combination thereof. If the first user 101 starts using the smart watch again and/or wears the smart watch again, the smart watch and the first user 101 may be authenticated again after authentication information is provided by the first user 101 a second time. In certain embodiments, the same process described above may be repeated for the second user 115 using the wearable smartphone. The first user 101 may indicate in the first user's 101 profile that the second user 115 is authorized to access connectivity services under the plan and/or join the device ecosystem 114. If the second user 115 effectively authenticates, the system 100 may allow the wearable smartphone to exchange data and communications with the devices in the device ecosystem 114.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving biometric data, a movement signature, and/or authentication information from a wearable device (e.g. first, second, third, and/or fourth user devices 102, 106, 110, 116) worn by a user; determining if the received biometric data, the movement signature, and/or the authentication information matches biometric data, movement signatures, and/or authentication information associated with a plan for connectivity services; preventing a wearable device from being provisioned with the connectivity services associated with the plan if the received biometric data, movement signature, and/or authentication does not match the information associated with the plan; authenticating the user wearing the wearable device and the user himself; provisioning connectivity services to the authenticated wearable device; delivering predefined settings to the wearable device; delivering communications to the wearable device that are sent to a primary device of the user; determining if the wearable device is still being worn by the user; deactivating the connectivity services from the wearable device if the wearable device is removed and/or removing the predefined settings; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a first user device 102, a second user device 106, a third user device 110, a fourth user device 116, a device ecosystem 114, a communications network 135, a server 140, a server 145, a server 150, a server 160, a database 155, a communications network 165, and a server 170. However, the system 100 may include multiple first user devices 102, multiple second user devices 106, multiple third user devices 110, multiple fourth user devices 116, multiple device ecosystems 114, multiple communications networks 135, multiple servers 140, multiple servers 145, multiple servers 150, multiple servers 160, multiple databases 155, multiple communications networks 165, multiple servers 170, or any number of any of the other components inside or outside the system 100. Furthermore, in certain embodiments, substantial portions of the functionality and operations of the system 100 may be performed by other networks and systems that may be connected to system 100.

Figure 2:
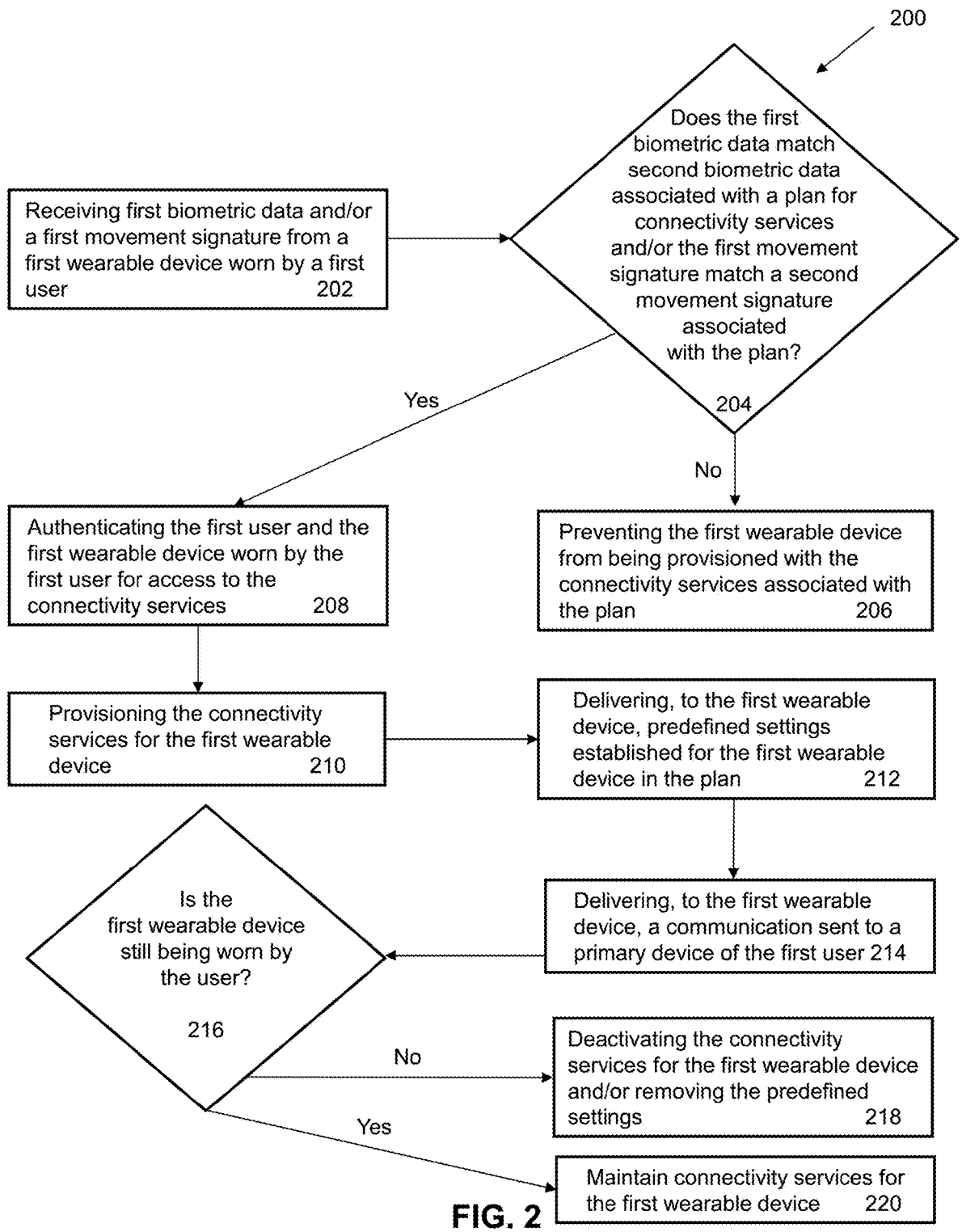
FIG. 2 is a flow diagram illustrating a sample method for providing wearable authentication and management according to an embodiment of the present disclosure.

As shown in FIG. 2, an exemplary method 200 for providing wearable authentication and management is schematically illustrated. The method 200 may include steps for authenticating a user and a wearable device of the user so as to enable the wearable device to join a device ecosystem 114 and share in connectivity services, communications, and other services associated with the device ecosystem 114. The method 200 may include, at step 202, receiving first biometric data, a first movement signature, and/or other authentication credentials from a first wearable device worn by a first user 101. For example, the first wearable device may be a smart watch worn by the first user 101 (e.g. second user device 106). The biometric data sent may include, but is not limited to, fingerprints, palm veins, faces, DNA, palm prints, hand geometry, iris scans, retina scans, odors, voices, height information, weight information, body temperature information, any other biometric information, or any combination thereof. The movement signature may be obtained via measurements gathered by an accelerometer (e.g. accelerometer 109) of the smart watch. Authentication information may include passwords, log on sequences, or other types of authentication information. In certain embodiments, the receiving of the biometric data, movement signature, and/or authentication information may be performed by utilizing the first user device 102, the second user device 106, the third user device 110, the fourth user device 116, the server 140, the server 145, the server 150, the server 160, the server 170, the communications network 135, the communications network 165, the device ecosystem 114, any combination thereof, or by utilizing any other appropriate program, network, system, or device.

At step 204, the method 200 may include determining if the first biometric data, the first movement signature, and/or the other authentication information received from the first wearable device worn by the first user 101 match with second biometric data, a second movement signature, and/or authentication information associated with a plan for connectivity services. For example, if the smart watch of the first user 101 sent a movement signature, the method 200 may include determining if the movement signature sent by the smart watch matches a movement signature stored in a user profile associated with a plan for connectivity services. In certain embodiments, the determining may be performed by utilizing the first user device 102, the second user device 106, the third user device 110, the fourth user device 116, the server 140, the server 145, the server 150, the server 160, the server 170, the communications network 135, the communications network 165, the device ecosystem 114, any combination thereof, or by utilizing any other appropriate program, network, system, or device. If the first biometric data, the first movement signature, and/or the other authentication information received from the first wearable device worn by the first user 101 do not match with the second biometric data, a second movement signature, and/or authentication information associated with the plan for connectivity services, the method 200 may include, at step 206, preventing the first wearable device from being associated with the plan and preventing the first wearable device from being provisioned with the connectivity services. In certain embodiments, the preventing may be performed by utilizing the first user device 102, the second user device 106, the third user device 110, the fourth user device 116, the server 140, the server 145, the server 150, the server 160, the server 170, the communications network 135, the communications network 165, the device ecosystem 114, any combination thereof, or by utilizing any other appropriate program, network, system, or device.

If, however, at step 204, it is determined that the first biometric data, the first movement signature, and/or the other authentication information received from the first wearable device worn by the first user 101 do match with second biometric data, a second movement signature, and/or authentication information associated with the plan for connectivity services, the method 200 may proceed to step 208. At step 208, the method 200 may include authenticating the first user 101 and the first wearable device worn by the first user 101 for access to the connectivity services under the plan. When authenticated, the first wearable device may join a device ecosystem 114 associated with the plan that includes one or more devices of the first 101 and/or other users. In certain embodiments, the authentication may be performed by utilizing the first user device 102, the second user device 106, the third user device 110, the fourth user device 116, the server 140, the server 145, the server 150, the server 160, the server 170, the communications network 135, the communications network 165, the device ecosystem 114, any combination thereof, or by utilizing any other appropriate program, network, system, or device. At step 210, the method 200 may include activating and/or provisioning connectivity services for the first wearable device worn by the first user 101. For example, once the smart watch of the first user 101 is authenticated, the system 100 may activate and/or provision wireless connectivity for the smart watch. In certain embodiments, the connectivity services to be provided to the wearable device may be specified in the first user's 101 user profile or even another user's user profile. In certain embodiments, the activating and/or provisioning may be performed by utilizing the server 140, the server 145, the server 150, the server 160, the server 170, the communications network 135, the communications network 165, the device ecosystem 114, any combination thereof, or by utilizing any other appropriate program, network, system, or device.

Once the connectivity services are activated and/or provisioned for the first wearable device, the method 200 may include, at step 212, delivering one or more predefined settings established for the first wearable device. For example, the first user 101 or another user associated with the plan may have specified settings to be pushed to the smart watch when the smart watch is worn and wireless connectivity is activated for the smart watch. In certain embodiments, the settings may be included within the first user's 101 user profile. In certain embodiments, the system 100 may automatically push settings to the smart watch based on the capabilities and functionalities of the smart watch itself. As an example, the system 100 may detect the download capabilities, the processing capabilities, the memory capabilities, the program installed on the smart watch, the technical specifications of the smart watch, the messaging capabilities of the smart watch, the communications capabilities of the smart watch, and other capabilities of the smart watch, and then push settings corresponding to those capabilities to the smart watch. In certain embodiments, the delivering of the one or more predefined settings may be performed by utilizing the server 140, the server 145, the server 150, the server 160, the server 170, the communications network 135, the communications network 165, the device ecosystem 114, any combination thereof, or by utilizing any other appropriate program, network, system, or device.

At step 214, the method 200 may include delivering one or more communications to the first wearable device that may be sent to a primary device of the first user 101 or even another user associated with the connectivity plan. For example, if the first user 101 has a smartphone (e.g. first user device 102) that has a particular telephone number, a call or a text message sent from the second user 115 that was sent to the telephone number of the first user's 101 smartphone may be delivered to the smart watch. Notably, this may be accomplished without establishing a new phone number for the smart watch. In certain embodiments, the delivering of the one or more communications to the first wearable device may be performed by utilizing the first user device 102, the second user device 106, the third user device 110, the fourth user device 116, the server 140, the server 145, the server 150, the server 160, the server 170, the communications network 135, the communications network 165, the device ecosystem 114, any combination thereof, or by utilizing any other appropriate program, network, system, or device. At step 216, the method 200 may include determining if the first wearable device is still being worn and/or utilized by the first user 101. For example, the system 100 may determine based on the accelerometer measurements from the accelerometer of the smart watch that the first user 101 has removed the watch. In certain embodiments, a proximity sensor, location sensor, and/or motion sensor of the smart watch may be utilized to determine whether the first user 101 is still wearing the smart watch. As another example, the system 100 may determine that the smart watch is no longer being used if the first user 101 turns off the smart watch or does not use one or more functions of the smart watch for a threshold period of time. In certain embodiments, the determining may be performed by utilizing the first user device 102, the second user device 106, the third user device 110, the fourth user device 116, the server 140, the server 145, the server 150, the server 160, the server 170, the communications network 135, the communications network 165, the device ecosystem 114, any combination thereof, or by utilizing any other appropriate program, network, system, or device.

If, at step 216, it is determined that the first user 101 is no longer wearing the first wearable device and/or not utilizing the first wearable device, such as for a threshold period of time, the method 200 may proceed to step 218. At step 218, the method 200 may include deactivating the connectivity services enabled and/or provisioned for the first wearable device, removing any predefined settings pushed to the first wearable device, removing any data and/or content received by the first wearable device while the connectivity services were enabled, removing the first wearable device from the device ecosystem 114, or any combination thereof. For example, if it is determined that the first user 101 has taken off the smart watch, the system 100 may deactivate the connectivity services for the smart watch and remove any settings and data and/or content received by the smart watch. In certain embodiments, step 218 may be performed by utilizing the first user device 102, the second user device 106, the third user device 110, the fourth user device 116, the server 140, the server 145, the server 150, the server 160, the server 170, the communications network 135, the communications network 165, the device ecosystem 114, any combination thereof, or by utilizing any other appropriate program, network, system, or device. If, however, at step 216, it is determined that the first user 101 is still wearing the first wearable device, the method 200 may, at step 220, maintain connectivity services for the first wearable device. Using the example above, the system 100 may continue to allow the connectivity services for the smart watch and the smart watch may share connectivity, communications, and data with the devices in the device ecosystem 114. In certain embodiments, the maintaining of the connectivity services may be performed by utilizing the first user device 102, the second user device 106, the third user device 110, the fourth user device 116, the server 140, the server 145, the server 150, the server 160, the server 170, the communications network 135, the communications network 165, the device ecosystem 114, any combination thereof, or by utilizing any other appropriate program, network, system, or device. Notably, the method 200 may further incorporate any of the features and functionality described for the system 100 or as otherwise described herein.

The systems and methods disclosed herein may include additional functionality and features. For example, based on the functionality provided by the systems and methods, in certain embodiments, the systems and methods may provide an ecosystem 114 of devices that support users that want to have multiple cellular-connected devices under a single plan. Additionally, the systems and methods may enable service switching between the devices in the plan. Furthermore, the systems and methods may allow for the sharing of connected devices between users, such as between friends and family, which allows for the development of a sharing economy that incentivizes users to share devices under the plan. In certain embodiments, the systems and methods may include transmitting notifications to the users indicating when a particular device is not being utilized or is not being utilized a threshold amount. In such a scenario, the system 100 may recommend that the users may save money if the user disconnects the unutilized or under-utilized device from the plan.

The systems and methods may enable users to have multiple devices for one user under a plan and/or multiple users for a single device under their plan. The systems and methods may enable the users to switch seamlessly between owned devices and borrowed devices (e.g. the first user 101 may authorize the second user 115 to use one or more of the first user's 101 devices) receiving their services without significant effort or provisioning for each device. Additionally, the systems and methods save users from having to open up a separate plan for connectivity services for each device they want to use. In certain embodiments, users may have multiple devices without having to maintain an individual connection for each device. In certain embodiments, the systems and methods may allow for more efficient use of network resources by only creating a connection for a wearable device while the wearable device is being worn and/or utilized. In certain embodiments, the users may specify that the predefined settings that are to be pushed to an authenticated device are the settings that correspond with another device in the device ecosystem 114. For example, the first user 101 may specify that the settings for the first user device 102 should be pushed to the second user device 106 when the second user device 106 is authenticated. In such a scenario, the second user device 106 may have receive the same notifications in the same way as the first user device 102, for example. Similarly, notifications that are blocked on the first user device 102 may also be blocked on the second user device 106.

In certain embodiments, any device that is not currently authenticated or has failed an authentication may be regulated and relegated to the communications network 165, which may prevent any such device from being provisioned with the connectivity services and receiving communications associated with the devices in a particular device ecosystem 114 that the user was attempting to authenticate into. In certain embodiments, if a device is stolen, the system 100 may monitor and track the location of the stolen device and share the location with the other devices in the device ecosystem 114. In certain embodiments, when a device authenticates with the system 100, any preferences contained in a user profile associated with the plan may be downloaded to the device that is authenticated. For example, such preferences may be any type of preference including, but not limited to, preferences associated with vehicle 175, preferences associated with products, preferences associated with investments, preferences associated with websites, any other preferences, or a combination thereof. As an example, if a smart watch is authenticated and the first user 101 is being driven in vehicle 175, the smart watch may transmit information contained in the profile that indicates that the first user 101 likes the air conditioning at 75 degrees, the top up, and/or that the user does not like to be driven faster than 60 miles per hour. Based on the information received from the smart watch, the vehicle 175 may automatically adjust the air conditioning settings, put the top up, and ensure that the vehicle 175 does not accelerate past 60 miles per hour. In certain embodiments, each of the devices in the system 100 may be IoT devices, which may be configured to communicatively link to each other using IoT technologies.

Figure 3:
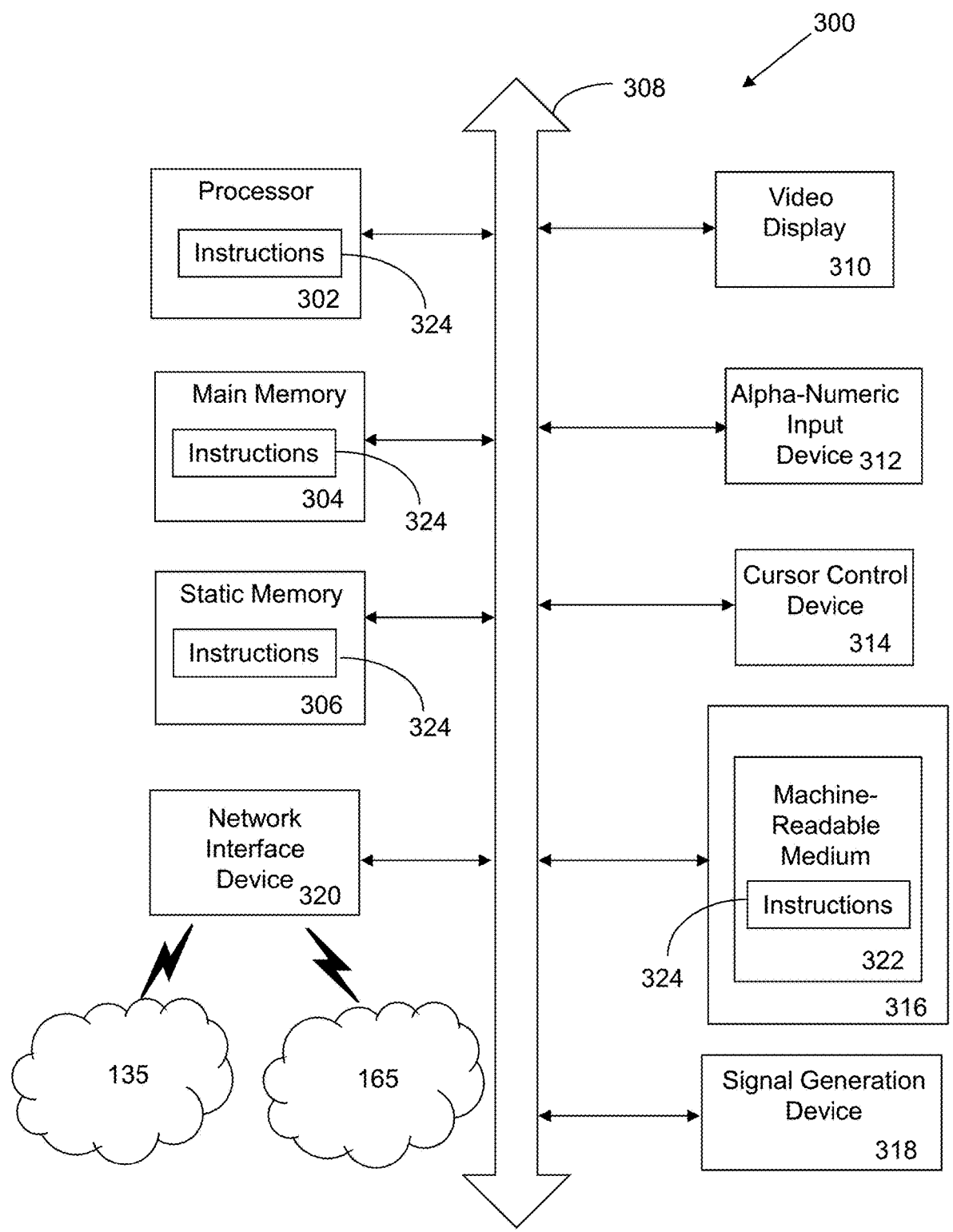
FIG. 3 is a schematic diagram of a machine in the form of a computer system within which a set of instructions, when executed, may cause the machine to perform any one or more of the methodologies or operations of the systems and methods for providing wearable authentication and management.

Referring now also to FIG. 3, at least a portion of the methodologies and techniques described with respect to the exemplary embodiments of the system 100 can incorporate a machine, such as, but not limited to, computer system 300, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, communications network 165, device ecosystem 114, another network, or a combination thereof) to and assist with operations performed by other machines and systems, such as, but not limited to, the first user device 102, the second user device 106, the third user device 110, the device ecosystem 114, the fourth user device 116, the server 140, the server 145, the server 150, the database 155, the server 160, the server 170, the vehicle 175, the home 178, the hotel 180, the shop 182, the bank 184, the entity 185, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310, which may be, but is not limited to, a liquid crystal display (LCD), a flat panel, a solid state display, or a cathode ray tube (CRT). The computer system 300 may include an input device 312, such as, but not limited to, a keyboard, a cursor control device 314, such as, but not limited to, a mouse, a disk drive unit 316, a signal generation device 318, such as, but not limited to, a speaker or remote control, and a network interface device 320.

The disk drive unit 316 may include a machine-readable medium 322 on which is stored one or more sets of instructions 324, such as, but not limited to, software embodying any one or more of the methodologies or functions described herein, including those methods illustrated above. The instructions 324 may also reside, completely or at least partially, within the main memory 304, the static memory 306, or within the processor 302, or a combination thereof, during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 322 containing instructions 324 so that a device connected to the communications network 135, the device ecosystem 114, the communications network 165, another network, or a combination thereof, can send or receive voice, video or data, and communicate over the communications network 135, the device ecosystem 114, the communications network 165, another network, or a combination thereof, using the instructions. The instructions 324 may further be transmitted or received over the communications network 135, the device ecosystem 114, the communications network 165, another network, or a combination thereof, via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (nonvolatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions; and
a processor that executes the instructions to perform operations, the operations comprising:
 authenticating a first wearable device worn by a first user for access to connectivity services associated with a plan provided by a service provider;
 connecting, after authenticating the first wearable device, the first wearable device to a device ecosystem;
 delivering, to the first wearable device, predefined settings established for the first wearable device in the plan for the connectivity services;
 removing, from the first wearable device, a communication delivered to the first wearable device when the first user no longer wears the first wearable device; and
 relegating, if the first wearable device is not utilized for a threshold period of time, the first wearable device to a network that blocks the first wearable device from accessing the device ecosystem.

2. The system of claim 1, wherein the operations further comprise delivering the communication to the first wearable device.

3. The system of claim 2, wherein the operations further comprise delivering the communication to the first wearable device after receiving the communication from a primary device associated with the plan.

4. The system of claim 1, wherein the operations further comprise provisioning, after authenticating the first wearable device, the connectivity services for the first wearable device.

5. The system of claim 1, wherein the operations further comprise receiving biometric data from the first wearable device.

6. The system of claim 5, wherein the operations further comprise authenticating the first wearable device upon determining that the biometric data matches other biometric data associated with the plan.

7. The system of claim 1, wherein the operations further comprise sharing, after the first wearable device is relegated to the network, information with other devices in the device ecosystem indicating that the first wearable device has been removed from the device ecosystem.

8. The system of claim 1, wherein the operations further comprise removing the predefined settings established for the first wearable device when the first wearable device is no longer worn.

9. The system of claim 1, wherein the operations further comprise tracking a location of the first wearable device.

10. The system of claim 9, wherein the operations further comprise sharing the location with other devices in the device ecosystem.

11. The system of claim 1, wherein the operations further comprise downloading, to the first wearable device, preferences contained in a user profile associated with the plan after authenticating the first wearable device.

12. The system of claim 1, wherein the operations further comprise facilitating the first wearable device in adjusting functionality of a computing device communicatively linked to the first wearable device based on the preferences.

13. The system of claim 1, wherein the operations further comprise authenticating the first wearable device for a transaction with a third party after authenticating the first wearable device.

14. A method, comprising:
 authenticating, by utilizing instructions from a memory that are executed by a processor, a first wearable device worn by a first user for access to connectivity services associated with a plan provided by a service provider;
 connecting, after authenticating the first wearable device, the first wearable device to a device ecosystem;
 delivering, to the first wearable device, predefined settings established for the first wearable device in the plan for the connectivity services;
 removing, from the first wearable device, a communication delivered to the first wearable device when the first user no longer wears the first wearable device; and
 relegating, if the first wearable device is not utilized for a threshold period of time, the first wearable device to a network that blocks the first wearable device from accessing the device ecosystem.

15. The method of claim 14, further comprising determining a movement signature of the first user.

16. The method of claim 15, further comprising authenticating the first wearable device for access to the connectivity services if the movement signature of the first user matches another movement signature associated with the plan.

17. The method of claim 14, further comprising deactivating the connectivity services for the first wearable device when the first wearable device is no longer worn.

18. The method of claim 14, further comprising facilitating the first wearable device in adjusting functionality of a computing device communicatively linked to the first wearable device based on preferences contained in a user profile associated with the plan.

19. The method of claim 14, further comprising sharing, after the first wearable device is relegated to the network, information with other devices in the device ecosystem indicating that the first wearable device has been removed from the device ecosystem.

20. A non-transitory computer-readable device comprising instructions, which, when executed by a processor, causes the processor to perform operations comprising:
- authenticating a first wearable device worn by a first user for access to connectivity services associated with a plan provided by a service provider;
- facilitating, after authenticating the first wearable device, connection of the first wearable device to a device ecosystem;
- providing, to the first wearable device, predefined settings established for the first wearable device in the plan for the connectivity services;
- removing, from the first wearable device, a communication delivered to the first wearable device when the first user no longer wears the first wearable device; and
- relegating, if the first wearable device is not utilized for a threshold period of time, the first wearable device to a network that blocks the first wearable device from accessing the device ecosystem.

* * * * *